Nov. 15, 1966   J. JENNY ETAL   3,285,346
METHOD OF FORMING A HOOF-COVERING
Filed Aug. 27, 1965                                   2 Sheets-Sheet 1

Nov. 15, 1966   J. JENNY ETAL   3,285,346
METHOD OF FORMING A HOOF-COVERING
Filed Aug. 27, 1965   2 Sheets-Sheet 2

United States Patent Office 3,285,346
Patented Nov. 15, 1966

3,285,346
METHOD OF FORMING A HOOF-COVERING
Jacques Jenny, Green Valley Farm, Unionsville, Pa.;
John Teti, 3323 Heritage Drive, Wilmington, Del.; and
Jack P. Anderson, R.D. 1, Kennett Square, Pa.
Filed Aug. 27, 1965, Ser. No. 483,191
Claims priority, application Switzerland, Aug. 27, 1964,
11,239/64
6 Claims. (Cl. 168—4)

This invention relates to a method for the manufacture of a hoof covering as well as to a hoof-covering manufactured according to this method.

The present conventionally used iron horseshoes which, as their name already implies, consist of metal such as, for example, iron, steel or aluminum, are fastened after heating, by nails to the lower side of the hoof wall, and have certain inconveniences for the animal.

It is known already to the animal expert, and especially to the horse expert, that at least certain hoof portions form a part of the blood circulatory system. By pressure on the tip of the toe or on the sole of the hoof due to the weight of the horse body, the lateral walls of the hoof move outwardly, and in particular, their hind portion, the bars of the hoof wall, due to their elastic properties. Upon removal of the pressure, e.g., upon lifting the foot of the horse, the hoof or the hoof wall assumes again its original shape unstressed by the weight of the animal.

When the animal walks, a complex rhythmical change of shape of the hoof then takes place.

Since important blood vessels lead directly into the hoof, e.g. the vessels of the pad of the frog, said rhythmical changes of shape act like a pump on the blood circulating system and promote the circulation.

It is therefore clear that by shoeing the hoof with a relatively rigid and inelastic iron these complex changes of shape of the hoof are, if not entirely prevented, at least strongly held back.

Furthermore, the heavy and relatively inelastic conventional iron horseshoes do not sufficiently absorb and dampen the impacts occurring when the horse is stepping.

For dampening of such impacts it was proposed to provide the horseshoes with rubber calks or inserts. Besides the high expense of such calks, it has been experienced that the life span of such calking is very short. The same holds for so-called rubber horseshoes, used as sheathing over the lower portions of the iron shoed hoof. In addition let it be mentioned, however, that both abovenamed measures were mostly intended to act as skid protection. In both cases, however, an iron horseshoe has to be used at the same time.

While a non-skid rubber attachment fastened by conventional nails to the hoof allowed a change of form of the hoof, its manufacture is costly and the fastening to the hoof unsatisfactory, as it gets loose too soon.

With all usual methods of making hoof coverings, the latter are secured to the hoof by nails.

It is an object of the present invention to provide a method of producing an elastic hoof covering comprising the steps of inserting the hoof into a casting mold leaving a clearance between the mold walls and the surface of the hoof, and filling the mold cavity formed by said clearance with a plastic material capable of solidifying, hardening said plastic material and removing the mold after the hardening of the plastic material.

A further object of the invention is the provision of a hoof covering having improved elastic and impact dampening properties.

Further objects and advantages of the invention will be apparent from the following description.

The accompanying drawings illustrate by way of example a hoof covering obtained by the method according to the present invention.

Figure 1:
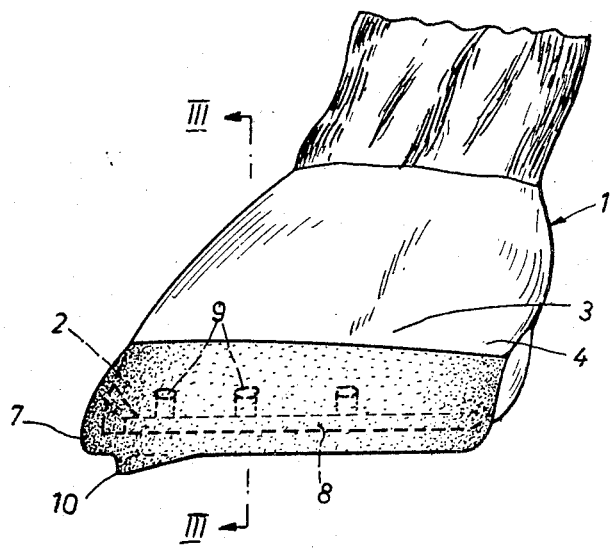
FIG. 1 is a view in elevation of a hoof fitted with a covering according to the invention.
Figure 2:
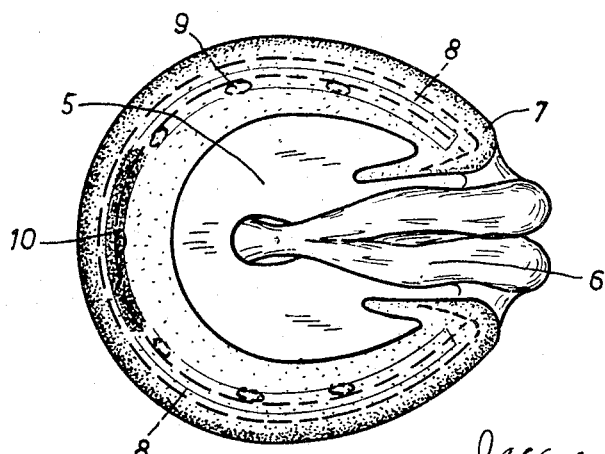
FIG. 2 is a bottom plan view of the hoof shown in FIG. 1.
Figure 3:
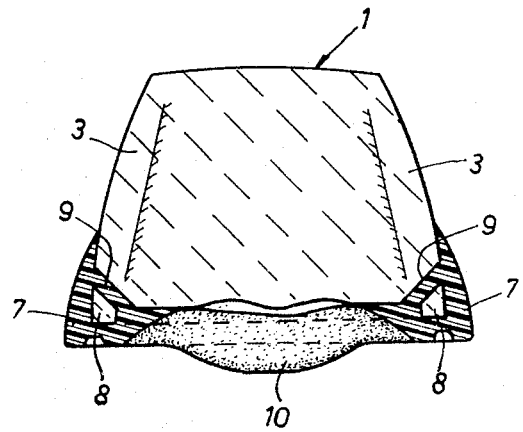
FIG. 3 is a diagrammatic section along the line III—III of FIG. 1.

In FIGS. 1 to 3, the reference number 7 designates a hoof of a horse.

As is well-known, the hoof is the end of each extremity of ungulate animals covered by the horn capsule consisting of horn wall, horn sole, and horn frog.

The horn wall itself is divided into toe 2, side wall 3 and bar 4. The lower side of the hoof 1 consists of the sole 5 and the frog 6. The whole hoof 1 consists of relatively elastic material, the horn capsule being the hardest and the frog the softest portion.

For attaching the covering 7, the hoof 1 is introduced into a suitable casting-mold. Since the material of the covering is very light, no special care has to be taken for establishing the wall thickness of the covering, obviously, a minimum thickness must naturally be present, so that with a few mold types a great number of different hoofs can be handled. The seal of the casting-mold should preferably be so formed that the neck of the mold can be located against the horn capsule. As a closure of the mold on the bottom thereof, a rubber plate fitting to the sole 5 and frog 6 or a soft, heat insensitive pad is suitable, for example.

Figure 4:
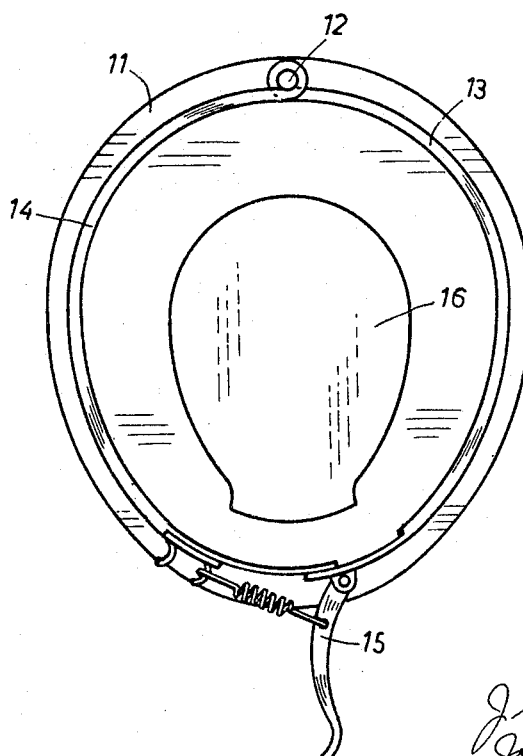
FIG. 4 is a diagrammatic plan view of an embodiment of a casting-mold used in producing the covering.

Such a casting-mold is diagrammatically illustrated in FIG. 4. It comprises substantially a base plate 11 of metal, a bolt 12 projecting at right angles therefrom, on which bolt two curved mold halves 13 and 14 are pivoted. The mold halves 13, 14 can be telescoped with their free ends. A resilient seal 15 of known structure serves to fasten both halves 13, 14 of the mold in their operative position and to press them along a definite line onto the horn wall of the hoof. The central portion of the mold is provided with an elastic cushion 16 located against the sole and frog of the hoof.

Before the introduction into the casting-mold the hoof 1 may be pretreated. This preparatory work consists in forming by milling or cutting a comb 8 of horseshoe shape into the lower side of the hoof wall. Moreover, guide borings 9 are formed sloping downwards and inwards, in the toe portion 2 of the hoof wall and in the side walls 3.

After the pre-treated hoof 1 is introduced into the casting-mold, the mold cavity formed by the mold wall and the hoof 1 is filled with a solidifiable plastic material. As casting material the plastics belonging to the group of elastomers are especially suited, such as polyurethane. A binder is already added to the material, or it is admixed to it during the casting. With the reaction resulting in the solidification of the casting material, temperatures in the range between 100° C. and 200° C. occur according to the speed of the solidifying process. These temperatures are harmless for the animal. After hardening of the material, the mold is removed from the hoof.

It will be understood that the liquid casting material penetrates into the bores 9 and forms additional stays for the covering 7 having the shape of a horseshoe overlapping the hoof rim.

It is obvious that the shoe, according to the formation of the casting mold, can be provided with arbitrarily designed projections such as a nose 10 on its lower side, serving as protection against sidding. Also calks of any desired shape, of a hard material like metal, can be imbedded into the casting-material.

Last of all, the desired final form can be given the hardened covering 7 by a finishing treatment, e.g. by means of a rasp.

The covering produced as described is elastic in every respect, and fulfills the demands placed on it completely. The plastic covering cast upon the hoof besides follows undisturbed hoof growth.

The hoof diseases caused by hoof nails, like studding with nails and weakening the hoof wall, inflammations, etc. can no longer appear.

As experience has shown, this type of hoof protection stimulates the regeneration of the horn capsule, what especially with injuries or defects thereof proves beneficial. Last but not least is this method significantly more economical than shoeing the hoof with the conventional iron horseshoes.

We claim:

1. A method of producing an elastic animal hoof covering, comprising the steps of inserting the animal's hoof into a casting mold leaving a clearance between the mold walls and the surface of the hoof, and filling the mold cavity formed by said clearance with a plastic material capable of solidifying, hardening said plastic material and removing the mold after the hardening of the plastic material.

2. A method as defined in claim 1, in which said material filled into the mold cavity comprises a plastic of the group of elastomers and a binder.

3. A method according to claim 1, in which the marginal portion of the hoof sole is stepped to form a downwardly projecting comb member.

4. A method according to claim 1, in which the portion of the hoof entering the mold cavity is provided with inclined bores extending from the outer surface of the hoof towards the sole of the hoof, said bores being filled with plastic casting material.

5. A method according to claim 1, in which a finishing treatment is effected on the cast and hardened hoof covering for imparting the final shape to the covering.

6. A method according to claim 1, in which calks are placed upon the bottom of the mold to be embedded in the hoof covering material.

References Cited by the Examiner

UNITED STATES PATENTS

| 144,833 | 11/1873 | Cooke | 168—4 |
| 861,033 | 7/1907 | Humphreys | 168—20 |
| 2,041,538 | 5/1936 | Gash et al. | 168—4 |
| 3,236,310 | 2/1966 | Quick | 168—18 |

SAMUEL KOREN, *Primary Examiner.*

HUGH R. CHAMBLEE, *Examiner.*